United States Patent [19]
McKinney et al.

[11] Patent Number: 5,648,915
[45] Date of Patent: Jul. 15, 1997

[54] SOFT TISSUE DAMAGE ASSESSMENT SYSTEM

[75] Inventors: Richard A. McKinney, Clarksville, Va.; Donald R. Myers, Cary, N.C.; Barbara J. McKinney, Clarksville, Va.; David B. Moody, Cary, N.C.; Joseph G. Smrcka, deceased, late of Westport, Conn.; John J. Smrcka, executor, Dallas, Tex.; Joshua Y. Zhu, Walled Lake; Daniel P. Weeder, Westland, both of Mich.

[73] Assignee: Triangle research & Development Corporation, N.C.

[21] Appl. No.: 560,904

[22] Filed: Nov. 20, 1995

[51] Int. Cl.$^6$ .............................. G01B 3/10; G01M 7/00
[52] U.S. Cl. ................. 364/507; 73/866.4; 73/865.6; 382/141; 382/154
[58] Field of Search .................. 364/507; 73/865.1, 73/865.6, 866.4; 382/141, 149, 154

[56] References Cited

U.S. PATENT DOCUMENTS

| | | | |
|---|---|---|---|
| 3,841,163 | 10/1974 | Daniel | 73/866.4 |
| 4,161,874 | 7/1979 | Specker et al. | 73/12.01 |
| 4,277,802 | 7/1981 | Yoshida | 348/129 |
| 4,691,556 | 9/1987 | Mellander et al. | 73/12.01 |
| 4,873,867 | 10/1989 | McPherson et al. | 73/493 |
| 4,957,297 | 9/1990 | Hansen | 395/328 |
| 5,472,233 | 12/1995 | Horiuchu et al. | 280/743.1 |
| 5,490,411 | 2/1996 | Hogan | 73/12.13 |
| 5,526,707 | 6/1996 | Smrcka | 73/866.4 |
| 5,528,943 | 6/1996 | Smrcka et al. | 73/866.4 |
| 5,589,651 | 12/1996 | Viano et al. | 73/866.4 |

FOREIGN PATENT DOCUMENTS

| | | | |
|---|---|---|---|
| 2358716 | 2/1978 | France | 73/866.4 |

OTHER PUBLICATIONS

J. Pickard, *An Objective Method of Assessing Laceration Damage to Simulated Facial Tissues* 5 pages, Nov. 1973, U.S.A.

First Technology Safety Systems, Inc., *Anthropomorphic Test Devices Hybrid II 50th Precentile Male Test Dummy* 2 pages, 1992, U.S.A.

First Technology Safety Systems, Inc., *Anthropomorphic Test Devices Hybrid III 50th Percentile Male Test Dummy* 2 pages, 1992, U.S.A.

*Primary Examiner*—Ellis B. Ramirez
*Assistant Examiner*—Tuan Q. Dam
*Attorney, Agent, or Firm*—Howard & Howard

[57] ABSTRACT

A system for assessing damage to a simulated human skin includes a mask formed of an opaque material simulating human skin and having an outer surface in a shape simulating a human body part, such as a face, and a form formed of a rigid transparent material and having an outer surface in a shape of the mask for releasably retaining the mask. A light source is positioned behind the form for transmitting light through any laceration in the mask and a camera views the outer surface of the mask and generates an output signal representing an image of at least a portion the outer surface of the mask including any lacerations. A housing encloses the form, the light source and the camera to prevent light exterior to the housing from being viewed by the camera. A computer is responsive to the camera output signal for detecting and measuring a laceration in the mask, and for assigning an injury criteria to the laceration. A video monitor connected to the computer permits display of the mask for calibrating the system and selecting an area of the mask outer surface to be inspected.

20 Claims, 4 Drawing Sheets

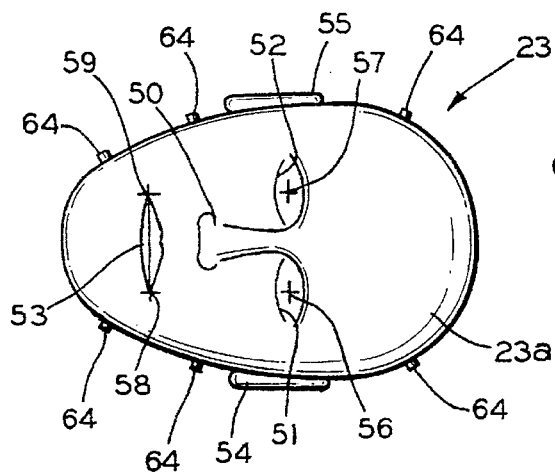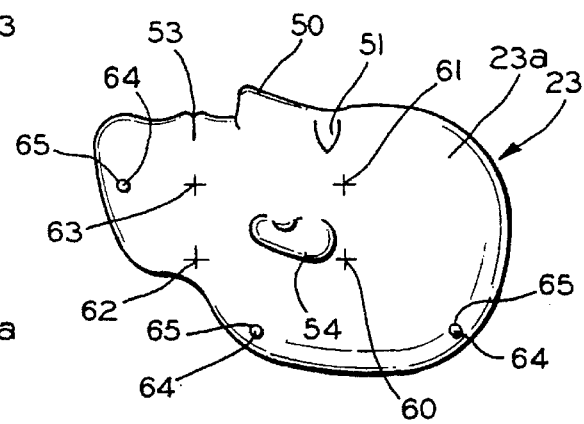
FIG. 3   FIG. 4
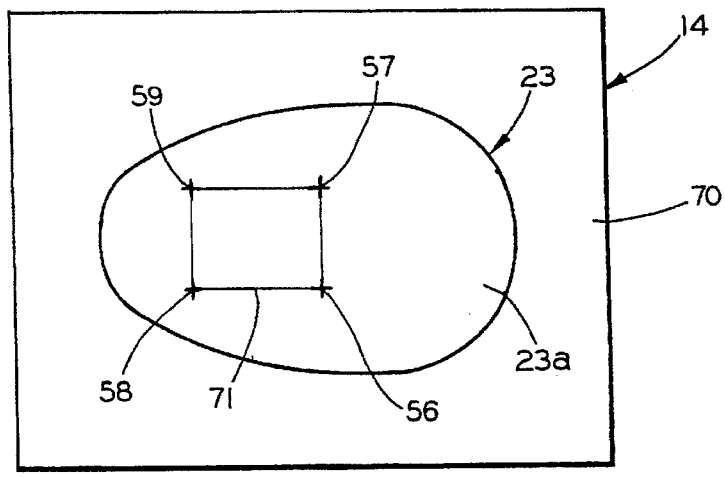
FIG. 5
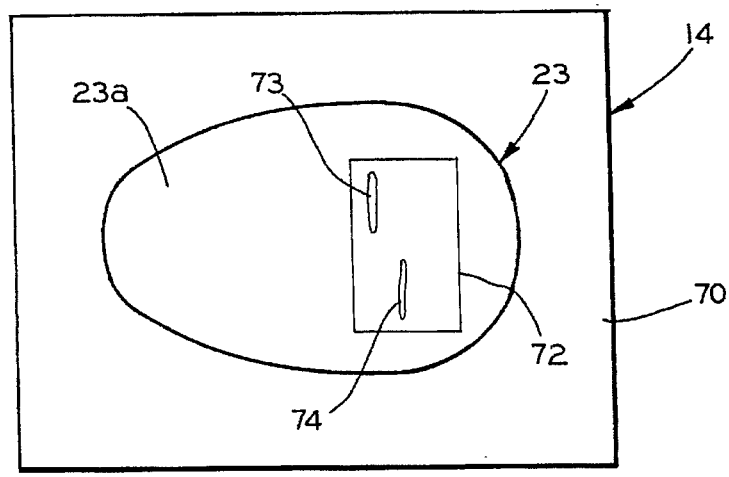
FIG. 6

SOFT TISSUE DAMAGE ASSESSMENT SYSTEM

BACKGROUND OF THE INVENTION

The present invention relates generally to anthropomorphic test dummies of the type utilized for aviation and automotive crash research and, in particular, to a system for assessing soft tissue damage to such dummies.

Simulated crashes have been used to test the safety of vehicles and their components. Such tests may involve the use of dummies simulating human beings or other devices selected to simulate particular parts of the human body. In these tests, it is desired to obtain a measure of the damage that would be sustained by a human being in similar circumstances. In the testing of windshields in particular, the damage is generally measured from the acceleration pulses and the facial lacerations sustained by the head of an anthropomorphic dummy or similar simulator. A medical interpretation is then placed on these measurements to estimate the degree of injury that a human being would be expected to suffer in similar circumstances. Thus, there are two distinct but dependent steps: measurement and interpretation.

In the case of head acceleration, the measurement can be made with some precision utilizing accelerometers. The interpretation is less precise, but attempts have been made by use of various criteria, such as the Gadd Severity Index and the Head Injury Criterion, to relate acceleration measurements to injury in medical terms. In the case of facial laceration, the situation is much less precise. Both the measurement of laceration on simulations of skin and on subcutaneous tissue and their interpretation in terms of the expected severity of injury have been a matter of skilled subjective judgment.

Attempts have been made to produce numerical ranking scales of the severity of general facial laceration. The Corning Scale is one of the most comprehensive and widely used. It uses a skin and subcutaneous tissue simulation consisting of two chamois leathers covering an underlying layer of rubber. Many other ranking scales used are derived from the Corning Scale or generally correspond to it.

Another known laceration scale is the Triplex Laceration Index which was developed for the quantitative assessment of the severity of lacerations in the two layers of chamois leather and the subcutaneous tissue simulation used in laceration investigations. This method uses a simple mathematical formula to relate the severity of laceration to the number, length and depth of cuts in the tissue simulations. The formula gives an excellent correlation with the existing scale used by Corning and was devised using the data on various levels of laceration obtained on an impact rig resembling the Corning Skull Impactor.

In approximately 92% of frontal impacts, where car drivers wearing seat belts strike their heads against steering wheels, soft tissue injuries result. Approximately 57% of these are single facial injuries. The lifesaving benefits of seat belts are now beyond question. However, the use of seat belts (along with air bags) has increased the need to understand the biomechanics of other, less severe traumas, such as facial laceration.

Test dummies are a very important tool for use in evaluating the crashworthiness of vehicles. In fact, such dummies have become the stars of television, radio and print media advertisements. In the field of automotive crash test research, various types of dummies have been developed to represent a range of sizes of adults and children associated with the human population.

A full line of anthropomorphic test dummies is available from First Technology Safety Systems, Inc. of Plymouth, Mich. Included in the line are a BioSID side impact test dummy, Hybrid III test dummies in ninety-fifth percentlie male, fifth percentile female, and fiftieth percentile configurations, a Side Impact model 572-SID test dummy, a Hybrid II fiftieth percentlie test dummy, six-year-old and three-year-old child test dummies, a three-year-old airbag test dummy, a model CAMI-II infant test dummy, and VIP model test dummies in ninety-fifth and fifth percentlie configurations.

The BioSID test dummy utilizes Hybrid III head, neck and leg assemblies and six ribs which are an adaptation of the Hybrid III design constructed from vascomax steel and oriented 90° so that the faces of the ribs are turned toward the area of impact. The BioSID pelvis is capable of accepting a pubic and sacrum load cell. The Hybrid III ninety-fifth percentile male and the Hybrid III fifth percentile female test dummies include a three- or six-axis neck transducer, submarining indicator pelvis, chest displacement transducer, tibia-femur displacement transducers and mounts for head, chest and pelvis accelerometers. The Hybrid III fiftieth percentile test dummy eliminates the submarining indicator pelvis used on the other Hybrid III dummies and meets the specifications for the FMVSS 208 option specified in 49 CFR Part 572 Subpart E.

The Side Impact model 572-SID test dummy meets the specifications for the FMVSS 208 standard specified in 49 CFR Part 572 Subpart F utilizing Hybrid II head, neck and lower leg assemblies with upper and lower torso assemblies designed for side impacts. The Hybrid II fiftieth percentile test dummy meets the specifications for the FMVSS 208 standard specified in 49 CFR Part 572 Subpart B including mounts for head, chest and pelvis accelerometers.

The six-year-old child test dummy meets the specifications for the proposed FMVSS 208 standard and includes mounts for head, chest and pelvis accelerometers. The three-year-old test dummy meets the specifications for the FMVSS 213 standard specified in 49 CFR Part 572 Subpart C and includes mounts for head and chest accelerometers.

The three-year-old child airbag test dummy is of an experimental sit/stand construction. The infant test dummy meets the specifications for the FMVSS 213 standard specified in 49 CFR Part 572 Subpart D. and includes mounts for head, chest and pelvis accelerometers. The VIP test dummies include mounts in the head and chest for accelerometers.

The test dummies should simulate the response of a human body to crash forces with as much accuracy as possible. In addition to including sensors for measuring load and acceleration, the dummies are covered by an artificial "skin" molded from a polyurethane material for measuring laceration injuries. The current practice of testing dummy headforms for laceration injuries is to fasten a chamois or leather covering over a headform and evaluate the damage using a known laceration scale.

SUMMARY OF THE INVENTION

The present invention concerns an apparatus for assessing soft tissue damages to a simulated human skin. In one embodiment, the system includes a mask formed of an opaque material simulating human skin and having an outer surface in a shape simulating a human face, a headform formed of a rigid transparent material and having an outer surface in a shape of the mask for releasably retaining the mask on the outer surface of the headform, a light source positioned behind the outer surface of the headform for transmitting light through the headform and through any laceration in the mask and a camera means for viewing the outer surface of the mask and for generating an output signal representing an image of at least a portion the outer surface of the mask. A housing encloses the headform, the light source and the camera to prevent light exterior to the housing from being viewed by the camera. A computer means connected to the camera and responsive to the output signal detects a laceration in the mask, determines a location of the laceration on the outer surface of the mask, measures the laceration and assigns an injury criteria to the laceration. An output means, such as a video monitor, is connected to the computer means for displaying the location of the laceration and the assigned injury criteria.

A second video monitor can be connected to the computer means for displaying an image of the outer surface of the mask to aid in calibrating the system and locating lacerations to measure. Another light source is positioned in front of the outer surface of the headform for illuminating the outer surface of the mask during calibration. A plurality of targets are formed on the outer surface of the mask to aid in calibration. A memory is connected to the computer for storing headform model data representing three-dimensional characteristics of the outer surface of the headform wherein the computer is responsive to the headform model data and data generated by measuring the laceration for assigning the injury criteria to the laceration. The headform is releasably supported on an adjustable bracket attached to the housing for permitting movement of the headform relative to a position of the camera in the housing. A keyboard is connected to the computer for entering data in response to operator prompts generated by the computer on said output.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 3 is an enlarged side elevation view of the mask shown in the FIG. 2;

FIG. 4 is an enlarged top plan view of the mask shown in the FIG. 2;

FIG. 5 is a front elevation view of the video monitor shown in the FIG. 1 with the mask targets displayed for calibration;

FIG. 6 is a front elevation view of the video monitor shown in the FIG. 1 with an area of interest on the mask displayed for calibration and measurement.

DESCRIPTION OF THE PREFERRED EMBODIMENT

Figure 1:
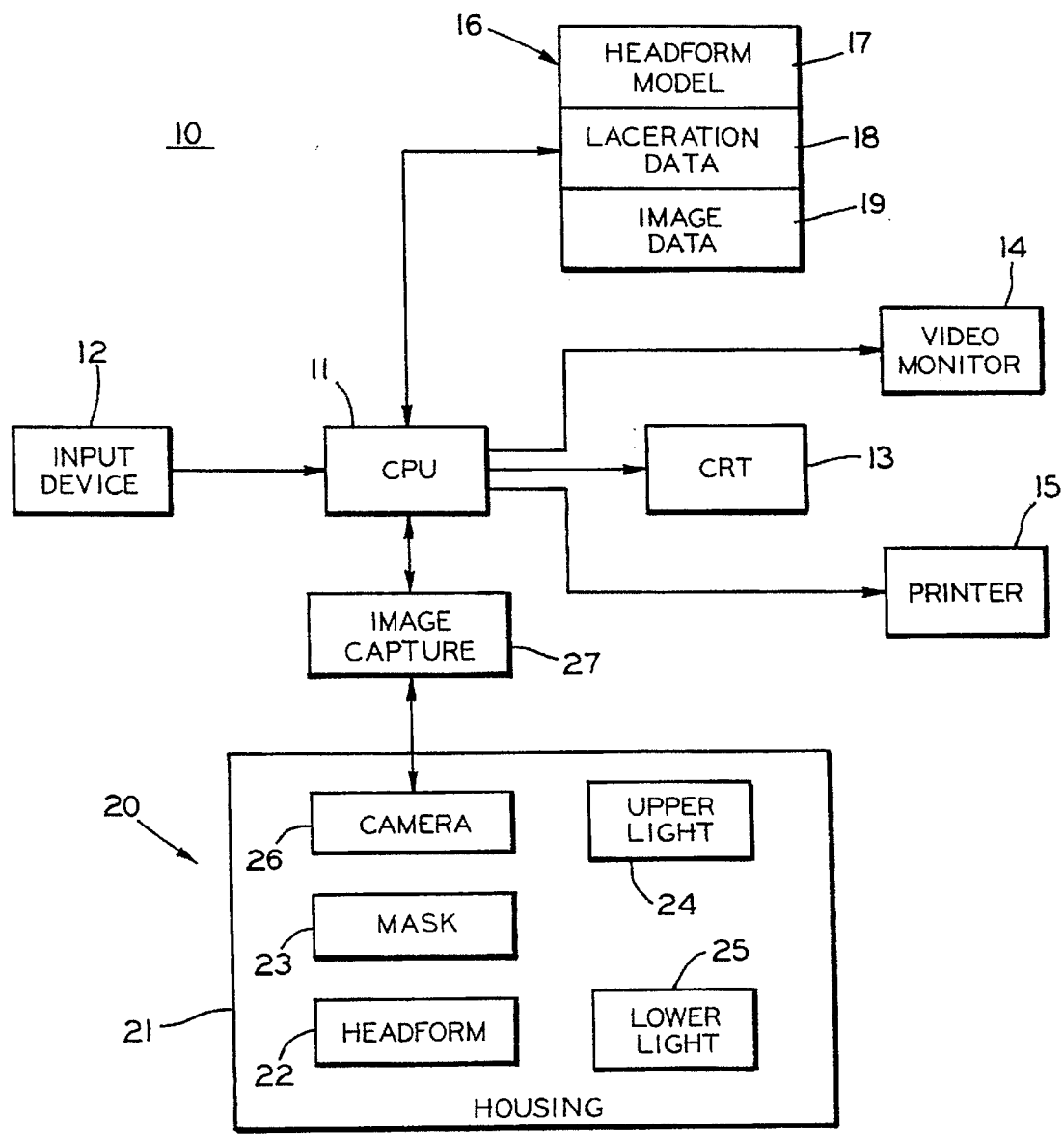
FIG. 1 is a schematic block diagram of a face laceration measurement system in accordance with the present invention.

There is shown in FIG. 1 a schematic block diagram of a facial laceration measurement system 10 according to the present invention. A central processing unit (CPU) 11 can be any suitable device such as a personal computer or portion of a mainframe computer. A first input of the CPU 11 is connected to an output of an input device 12, such as a keyboard, for receiving information and instructions. A first output of the CPU 11 is connected to an input of a first display device 13, such as a cathode ray tube (CRT) or video monitor, for displaying information generated by the CPU. A second display device 14, such as a color video monitor, has an input connected to a second output of the CPU 11. A third output of the CPU 11 is connected to an input of an output device 15 such as a printer. The CPU 11 is programmed to exchange information with a memory 16. The memory 16 has an input\output port connected to a first input/output port of the CPU 11 for storing information as to a model of three-dimensional characteristics of a headform in a first memory portion 17. A second memory portion 18 stores laceration analysis data and a third memory portion 19 stores image data.

Also included in the system 10 is an inspection fixture 20. The inspection fixture 20 has a housing 21 which encloses a headform 22 for mounting and retaining a mask 23 to be inspected. The headform 22 has an outer surface, the three-dimensional characteristics of which are stored in the memory portion 17. The headform 22 receives on its outer surface the mask 23. The mask 23 has an outer surface which has the same three-dimensional characteristics as the headform outer surface. Thus, the mask 23 is stretched slightly when mounted on the headform 22 to slightly expand and open up the lacerations for better detection. Also mounted within the housing 21 is an upper light source 24 for illuminating the outer surface of the mask 23 when mounted on the headform 22 and a lower light source 25 for illuminating an inner surface of the headform 22. A camera 26 for generating an analog signal representing a visual image of the outer surface of the mask 20 is mounted inside the housing 21. Input and output ports of the camera 26 are connected to corresponding output and input ports of an image capture circuit 27 which transforms the analog image signal generated by the camera into a digital signal. The circuit 27 has an input/output port connected to a second input/output port of the CPU 11 for receiving a capture signal from the CPU which determines the time at which the image generated by the camera 26 is to be captured. The digital information representing the captured image is generated from the input/output port of the circuit 27 to the second input/output port of the CPU 11 for storage in the image data memory portion 19. If the CRT 13 is a high resolution video monitor device, the second display 14 can be eliminated and the images displayed on the first video monitor.

Figure 2:
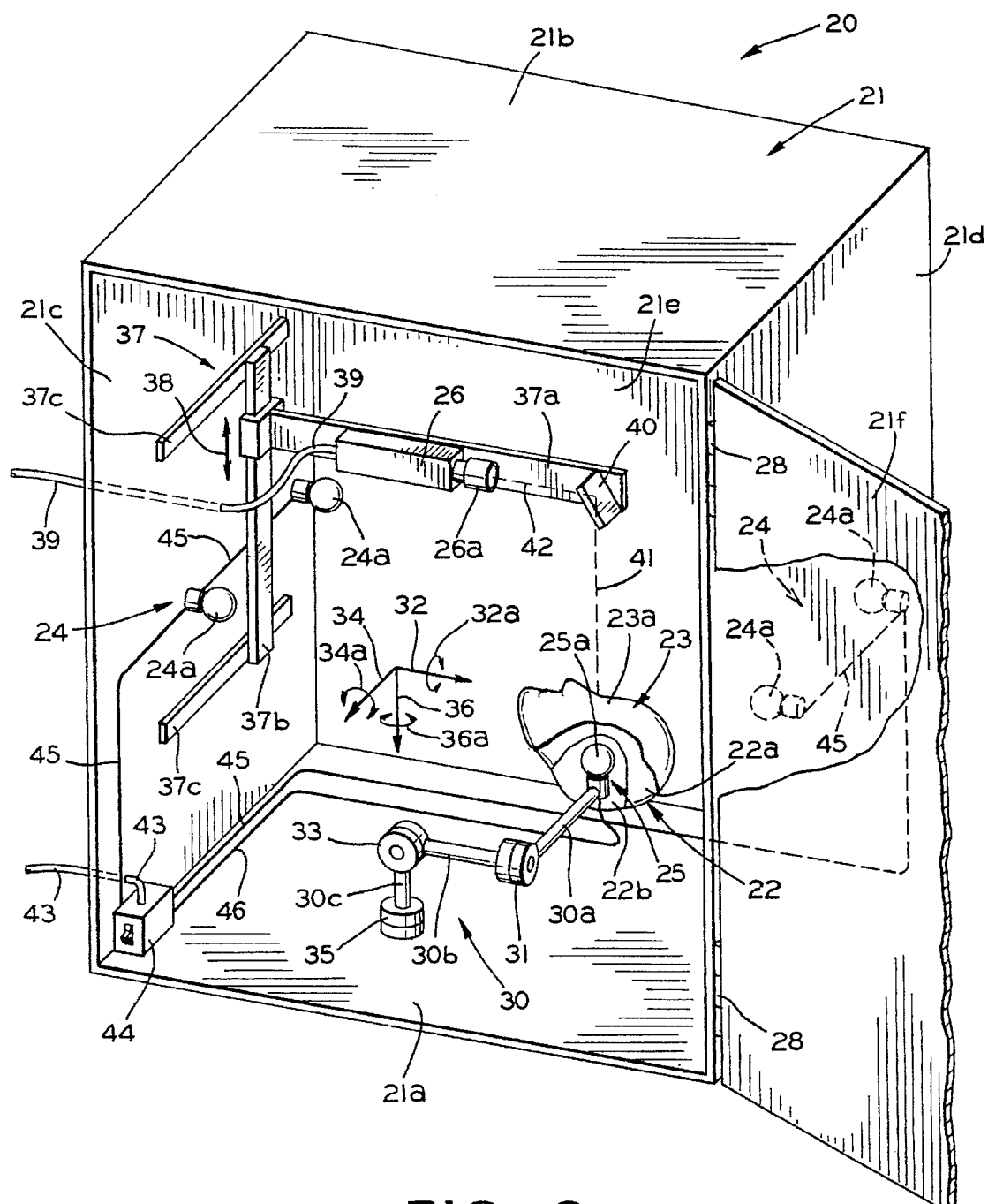
FIG. 2 is perspective view of the inspection housing and related measurement components shown in the FIG. 1.

There is shown in FIG. 2 the inspection and measurement components inside the inspection fixture 20 in more detail. The housing 21 has a generally hollow interior and is sealed to exclude exteriorly generated light. The housing 21 includes a generally horizontally extending lower wall 21a and a spaced, generally parallel upper wall 21b, the upper and lower walls being connected by a generally vertically extending left side wall 21c and a spaced, generally parallel right side wall 21d. The walls 21a through 21d are closed at a rear side of the housing 21 by a back wall 21e and are selectively closed at a front side by a front wall or door 21f attached to the right side wall 21d by a pair of hinges 28. The headform 22 is a mask formed of a transparent rigid material having an outer surface 22a which duplicates in its three-dimensional characteristics an outer surface of a headform of a crash test dummy. The headform 22 is attached an interior surface of the lower wall 21a of the housing 21 by an adjustable bracket 30. The bracket 30 includes a first arm 30a having one end attached to an interior surface 22b of the headform 22 and an opposite end attached to a first pivot joint 31 for rotation of the headform 22 and the mask 23 in plane perpendicular to an "X" axis 32 as indicated by an arrow 32a. The bracket 30 includes a second arm 30b having one end attached to the first pivot joint 31 and an opposite end attached to a second pivot joint 33 for rotation of the headform 22 and the mask 23 in plane perpendicular to a "Z" axis 34 as indicated by an arrow 34a. The bracket 30 also includes a third arm 30c having one end attached to the second pivot joint 33 and an opposite end attached to a third pivot joint 35 for rotation of the headform 22 and the mask 23 in plane perpendicular to a "Y" axis 36 as indicated by an arrow 36a. The third pivot joint 35 is attached to the interior surface of the lower wail 21a. Thus, the position of the headform 22 and of the mask 23 is adjustable through selectable rotation about three mutually orthogonal axes.

The camera 26 is attached to an interior surface of the left side wail 21c of the housing 21 by a bracket 37. The camera 26 is mounted on an arm 37a having one end attached to a generally vertically extending track 37b. The track 37b has opposite ends attached to a pair of spaced apart mounting brackets 37c attached to the inside surface of the left side wall 21c. The arm 37a is movable along the track 37b in a generally vertical direction as shown by an arrow 38 to move the camera 26 toward and away from the headform 22. A video signal output cable 39 has one end attached to the input\output port of the camera 26 and an opposite end extending through the left side wall 21c for connection to the first input\output port of the image capture circuit 27 shown in the FIG. 1. An opposite end of the arm 37a extends over the headform 22 and has a mirror 40 mounted thereon. The mirror 40 is mounted an angle and aligned relative to a first field of vision 41 which extends generally vertically from the outer surface 22a of the headform 22 or the outer surface 23a of the mask 23 to the mirror. The mirror 40 is also aligned relative to a second field of vision 42 which extends generally horizontally from a lens 26a of the camera 26 to the mirror. Since the camera 26 and the mirror 40 are both mounted on the arm 37a, the fields of vision 41 and 42 will remain aligned as the arm is moved up and down.

The upper light source 24, shown in the FIG. 1, is mounted in the housing 21 so as to illuminate the outer surface 22a of the headform 22 or an outer surface 23a of the mask 23 mounted on the headform. The upper light source 24 includes a plurality of lamps 24a, a first pair of the lamps being mounted of the interior surface of the left side wall 21c and a second pair of the lamps being mounted of an interior surface of the right side wail 21d. A power cable 43 from a source of electrical power (not shown) extends through the left side wail 21c and is connected to a switch box 44. A pair of power lines 45 are connected between the switch box 44 and the pairs of lamps 24a for supplying electrical power. The lower light source 25 includes a lamp 25a mounted on the end of the arm 30a attached to the headform 22 and directed toward the inner surface 22a thereof. Since the headform 22 is transparent, light from the lower light source lamp 25a shines through the headform and through any lacerations in the mask 23 into the first field of view 41. Such light is reflected by the mirror 40 into the second field of view 42 for detection by the lens 26a of the camera 26.

There is shown in the FIG. 3 an enlarged top plan view and in the FIG. 4 an enlarged side view of the mask 23 mounted on the headform 22 as shown in the FIG. 2. The mask 23 has the outer surface 23a in which are formed human-like features such as a nose 50, a left eye socket 51, a right eye socket 52, a pair of lips 53, a left ear area 54 and a right ear area 55. Formed on the outer surface 23a are a plurality of reference points or targets which can be of any suitable form such as depressions or bumps formed in the mask 23 or marks applied to the outer surface. As shown, a first front target 56 is located in the left eye socket 51, a second front target 57 is located in the fight eye socket 52, a third front target 58 is located at a left corner of the lips 53 and a fourth front target 59 is located at a right corner of the lips 53. Additional sets of the reference points or targets can be located on either or both side surfaces, such as a first side target 60 located above and behind of the left ear 54, a second side target 61 located above and forward of the left ear, a third side target 62 located below and behind the left ear and a fourth side target 63 located below and in front of the left ear. The targets 56 through 63 and are reference points which are located at known positions on the outer surface 23a. These reference points can be detected by the camera 26 and used by the CPU 11 to determine the distance between the camera lens 26a and the outer surface 23a. Utilizing the detected targets and the headform model data from the memory 15, the CPU 11 can then determine the size and location of any lacerations in the mask 23. Alternative methods of locating the mask 23 relative to the camera 26 can be utilized including a light source fixed in the housing 21 at a known location relative to the location of the camera 26. The camera 26 would then transmit an image of the mask 23 mounted on the headform 22 and the known light source to the CPU 11 which would utilize known triangulation techniques to determine the position of the outer surface 23a relative to the camera.

The headform 22 can be formed of a material available from Innovative Engineering of DeWitt, Mich. and identified as a WC-782 A/B water clear rigid Shore "D" urethane casting system. The mask 23 can be formed from a material available from General Electric and identified as RTV 664 A & B silicone rubber compound. The mask is formed with a skin thickness of about one-tenth of an inch (2.6 millimeters) using a base to curing agent ratio by weight of 10 to 1. The components are mixed and injected into a mold for a minimum cure time of approximately 24 hours. The trimmed weight of a mask for a Hybrid III, 50th Percentile Dummy, is approximately eight-tenths of a pound (360 grams). It has been found that a light blue color for the mask provides the best surface color for detecting and measuring the lacerations.

In operation, the mask 23 is fitted over a dummy headform (not shown) and impacted according to a user selected method of testing. For example, the dummy headform with the mask 23 attached can be mounted in a head drop test fixture and dropped onto a vehicle windshield to simulate a crash in which a human head strikes the inside of a vehicle windshield. The impacted mask 23 is then removed from the dummy headform and installed on the transparent headform 22. As stated above, the dimensions of the mask 23 and the headform 22 cause the mask to be stretched slightly. The headform 22 can be detached from the bracket 30 and removed from the housing 21 for this procedure. It is important that the mask 23 be properly aligned with the headform 22 and retained in place thereon. A suitable retention means such as a plurality of posts 64 (FIGS. 3 and 4) each extending from the outer surface 22a of the headform 22 through a corresponding one of a plurality of apertures 65 formed in the mask 23 can be used. After the mask 23 has been mounted on the headform 22, the headform is reattached to the bracket 30. The upper light source 24 is switched on utilizing the switch box 44 for calibration and adjustment of the camera 26 for the best image. As shown in the FIG. 5, the color video monitor 14 has a viewing screen 70 for viewing the image of the outer surface 23a of the mask 23 as generated by the camera 26. Manual adjustments can be made to the arm 37a to change the position of the camera 26, to the bracket 30 to change the position of the mask 23 relative to the field of view 41, and to the focus of the lens 26a to obtain the best picture of the mask 23 on the screen 70. Then the door 21f is closed and the picture on the screen 70 is checked to make sure that nothing has shifted.

The CPU 11 generates a calibration window 71 on the screen 70 in the form of an outline which can be of any selected shape such as the rectangle shown. The window 71 can be adjusted in size such the corners of the window are superposed on the targets 56 through 59. Since the CPU 11 knows the size of the window 71 and the locations of the targets 56 through 59, the distance between the outer surface 23a and the camera 26 can be calculated to relate the headform model data in the memory portion 17 to the viewed outer surface of the mask 23 and any lacerations therein. The gain and offset values are set for the camera 26 utilizing the keyboard 12 to respond to prompts generated by the CPU 11 on the first video monitor 13 to achieve the best contrast at the targets. Calibration is now complete.

When the calibration is complete, the mask 23 can be inspected for lacerations to be analyzed. The upper light source 24 is turned off and the lower light source 25 is turned on utilizing the switch box 44. The CPU 11 generates an inspection window 72 which can be formed as a square, or rectangle, or an ellipse, or any desired shape. The gain and offset values are set for the camera 26 utilizing the keyboard 12 to respond to prompts generated by the CPU 11 on the first video monitor 13 to achieve the best contrast at the edges of the lacerations. At this time, the CPU 11 is signaled by the operator through the input device 12 to make an inspection of the area bounded by the window 72 for lacerations which will appear as bright areas due to the rear lighting from the lower light source 25. The CPU 11 will locate a first laceration or opening 73 and utilize the headform model data stored in the memory 15 to determine the location and size of that laceration. The CPU 11 will then locate a second laceration or opening 74 and utilize the headform model data stored in the memory 15 to determine the location and size of that laceration. The CPU 11 will continue to locate and collect data on the lacerations until the entire area within the window 72 has been inspected. The data on the characteristics of each laceration found is stored in the memory portion 18. After the area has been inspected, the CPU 11 analyzes the stored laceration data for the application of a predetermined injury criteria. The laceration data and the injury criteria can be displayed on the first video monitor 13.

Figure 7:
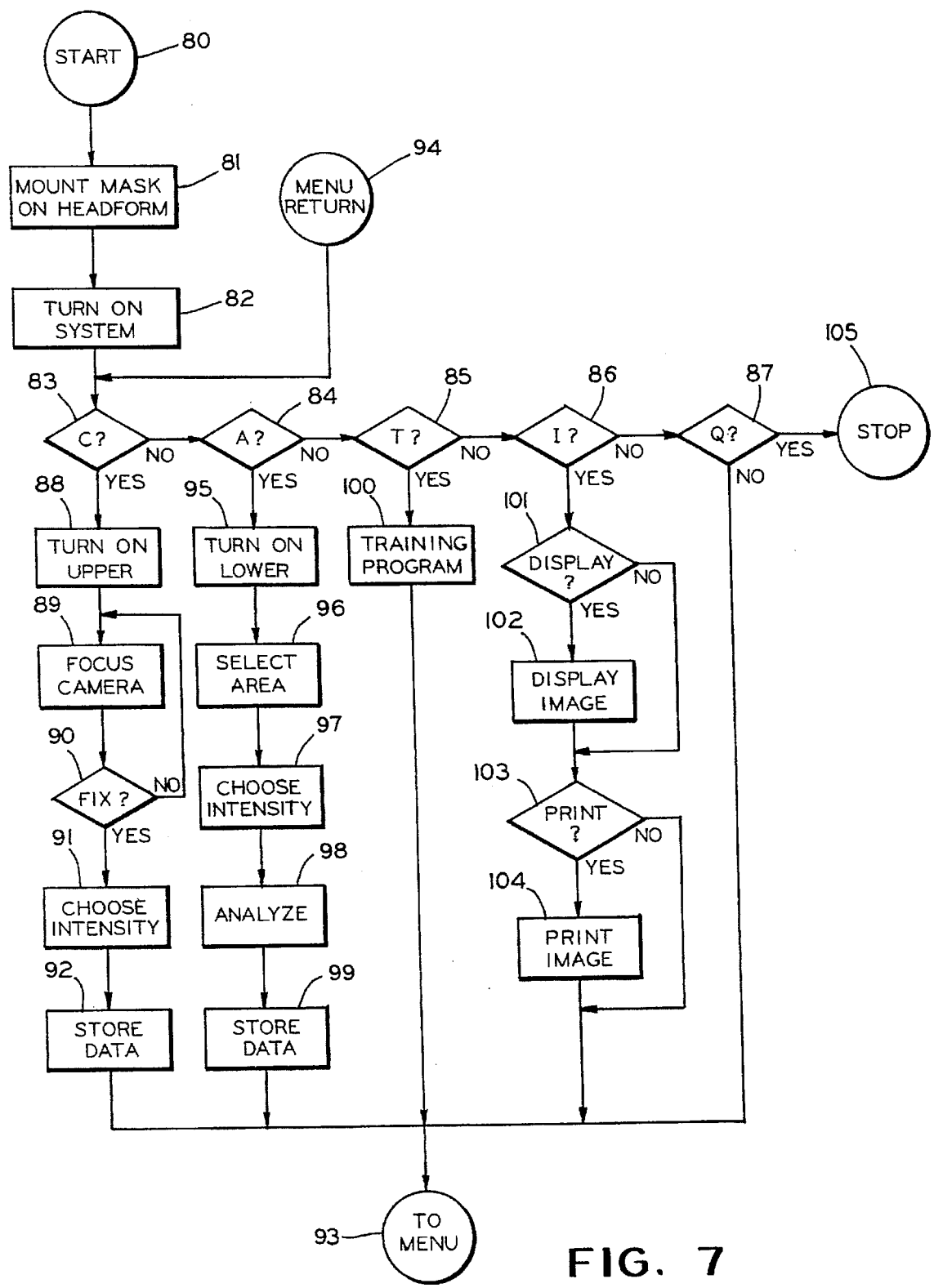
FIG. 7 is a flow diagram of the operation of the system shown in the FIG. 1.

A method of operation of the system 10 shown in the FIGS. 1 through 6 is shown in a flow diagram depicted in the FIG. 7. The method of operation begins at a "Start" circle 80 and enters a step 81 in which the mask 23 is mounted on the headform 22 and placed into the housing 21. The method then enters a step 82 in which the electrical components of the system 10 such as the CPU 11, the first video monitor 13, the color video monitor 14, and the camera 22 are turned on and warmed up. The CPU 11 displays a main menu on the first video monitor 13 from which the operator can select options of: "Calibrator", "Analyzer", "Trainer", "Image File Manager" and "Quit". The main menu is depicted in the FIG. 7 as a plurality of decision points 83 through 87. When a menu option is selected, the method branches at "yes" from the corresponding decision point. When a menu option is not selected, the method branches at "no" from the corresponding decision point.

When the "Calibrator" option is selected in the decision point 83, the method branches at "yes" to a step 88 wherein the operator turns on the upper light source 24. The method enters a step 89 wherein the operator focus the lens 26a of the camera 26 to obtain the best picture on the color video monitor 14. The method then enters a decision point 90 wherein the operator closes the door 21f of the housing 21 and checks the image. If the image is not properly displayed, the method branches at "no" back to the step 89. The method loops through the step 89 and the decision point 90 until the operator is satisfied with the image and a branch is made at "yes" to an instruction set 91. In the instruction set 91, the CPU 11 prompts the operator to align the calibration window 71 with the targets (56 through 59 in the FIG. 3 or 60 through 63 in the FIG. 4) and to choose the edge sensitivity at the targets. The method then enters an instruction set 92 in which the CPU 11 stores the calibration data for later use. The "Calibrator" option is now complete and the method exits at a "To Menu" circle 93 to return to the main menu at a "Menu Return" circle 94.

When the "Analyzer" option is selected in the decision point 84, the method branches at "yes" to a step 95 wherein the operator turns off the upper light source 24, if it is on, and turns on the lower light source 25. The method enters an instruction set 96 wherein the operator is prompted to align the inspection window 72 with the area on the outer surface 23a of the mask 23 to be inspected for lacerations. Next, in an instruction set 97, the operator is prompted to choose the edge sensitivity at the lacerations. The method then enters an instruction set 98 in which the CPU 11 scans the area inside the window 72, identifies and measures lacerations in the area and applies a predetermined injury criteria or index to the laceration data. The method enters an instruction set 99 in which the CPU 11 stores the laceration data in the memory portion 18 for later use. The "Analyzer" option is now complete and the method exits at the "To Menu" circle 93 to return to the main menu at the "Menu Return" circle 94.

When the "Training" option is selected, the method branches at "yes" from the decision point 85 for a training session. The method enters an instruction set 100 wherein a training program is displayed on the first video monitor to lead the student through the calibration and analysis procedures described above and the image procedure to be described below. At the end of the training session, the method exits at the "To Menu" circle 93 to return to the main menu at the "Menu Return" circle 94.

In the decision point 86, a decision is made as to whether a captured image is to be displayed or printed. If the "Image" option is selected, the method enters a decision point 101 to determine whether a selected image is to be displayed on the video monitor 14. If the image is to be displayed, the method branches at "yes" to an instruction set 102 wherein the CPU 11 prompts the operator to select the image to be displayed on the monitor 14. The method enters a decision point 103 from the instruction set 102 and from a "no" branch of the decision point 101. In the decision point 103, a determination is made as to the image is to the printed. If the image is to be printed, the method branches at "yes" and an instruction set 104 wherein the CPU 11 prompts the operator to select the image to be printed. The method exits the "Image" option at the "To Menu" circle 93 from either the instruction set 104 or from the "no" branch of the decision point 103.

In the decision point 87, a decision is made as to whether quit the operating procedures or return to the main menu. If the operator decides to quit, the method branches at "yes" to a "Stop" circle 105. The method also exits the "Quit" option at a "no" branch to the "To Menu" circle 93.

Although the present invention has been described in terms of system for measuring lacerations in a mask simulating the skin of a human face, soft tissue on any other portion of the human body could be simulated and damage thereto measured. For example, the headform 22 and mask 23 could be a kneeform and simulated knee skin. Thus, the terms mask and headform have been used to represent a skin simulating soft tissue from any part of the human body and a corresponding rigid transparent form for supporting the skin during damage measurement. The term laceration has been used to represent damage to the skin such as an opening which can be measured by the system of the present invention.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A system for assessing damage to a simulated human soft tissue comprising:

a skin formed of an opaque material stimulating human soft tissue and having an outer surface shape simulating a portion of a human body;

a form formed of a transparent material and having an outer surface in a shape of said skin releasably retaining said skin;

a light source positioned behind said outer surface of said form for transmitting light through said form and through any opening in said skin;

a camera means for viewing said outer surface skin when said skin is retained on said form and for generating an output signal representing an image of at least a portion said outer surface of said skin; and a computer means connected to said camera and responsive to said output signal for detecting an opening in said skin, for determining a location of said opening on said outer surface of said skin, for measuring said opening and for assigning a predetermined injury criteria to said opening.

2. The system according to claim 1 including an output means connected to said computer means for displaying said location of said opening and said assigned injury criteria.

3. The system according to claim 1 including a housing enclosing said form, said light source and said camera for preventing light exterior to said housing from being viewed by said camera.

4. The system according to claim 1 including another light source for selectively illuminating said outer surface of said skin.

5. An apparatus for assessing damage to a simulated human skin comprising a mask formed from an opaque silicone rubber compound material and having an outer surface of a shape simulating a portion of a human body whereby when said mask is subjected to a crash test which would cause lacerations in a human face skin, similar lacerations are formed in said mask.

6. The apparatus according to claim 5 wherein said material is blue in color.

7. The apparatus according to claim 5 wherein said material is approximately one tenth inch thick.

8. The apparatus according to claim 5 wherein said mask is adapted to be retained on a headform of an anthropomorphic test dummy.

9. The apparatus according to claim 5 including a headform formed of a rigid transparent material and having an outer surface in a shape of said mask, said mask being releasably retained by said headform for measuring lacerations in said mask.

10. The apparatus according to claim 5 including at least one target formed on said outer surface of said mask.

11. A system for measuring lacerations in a simulated human skin comprising:

a mask formed of an opaque material simulating human skin and having an outer surface in a shape simulating a human face;

a headform formed of a rigid transparent material and having an outer surface in a shape of said mask for releasably retaining said mask on said outer surface of said headform;

a light source positioned behind said outer surface of said headform for transmitting light through said headform and through any laceration in said mask;

a camera means for viewing said outer surface of said mask and for generating an output signal representing an image of at least a portion said outer surface of said mask;

a housing enclosing said headform, said light source and said camera for preventing light exterior to said housing from being viewed by said camera;

a computer means connected to said camera and responsive to said output signal for detecting a laceration in said mask, for determining a location of said laceration on said outer surface of said mask, for measuring said laceration and for assigning an injury criteria to said laceration; and an output means connected to said computer means for displaying said location of said laceration and said assigned injury criteria.

12. The system according to claim 11 wherein said output means is a video monitor.

13. The system according to claim 11 including a video monitor connected to said computer means for displaying an image of said outer surface of said mask.

14. The system according to claim 11 including another light source positioned in front of said outer surface of said headform for illuminating said outer surface of said mask.

15. The system according to claim 11 including a plurality of targets formed on said outer surface of said mask.

16. The system according to claim 11 including a memory connected to said computer means for storing headform model data representing three-dimensional characteristics of said outer surface of said headform wherein said computer means is responsive to said headform model data and data generated by measuring said laceration for assigning said injury criteria to said laceration.

17. The system according to claim 11 including an adjustable bracket attached to said housing for releasably supporting said headform and permitting movement of said headform relative to a position of said camera in said housing.

18. The system according to claim 11 including a retaining means for releasably retaining said mask on said outer surface of said headform.

19. The system according to claim 18 wherein said retaining means includes at least one post extending outwardly from said outer surface of said headform and at least one aperture formed in said mask for receiving said post.

20. The system according to claim 11 including a input means connected to said computer means for entering data in response to operator prompts generated by said computer means on said output means.

\* \* \* \* \*